United States Patent [19]
McCoy

[11] Patent Number: 5,031,749
[45] Date of Patent: Jul. 16, 1991

[54] APPARATUS AND METHOD FOR EXTRACTING TUBULAR ARTICLES

[75] Inventor: John W. McCoy, Elmwood Park, N.J.

[73] Assignee: Avon Products, Inc., New York, N.Y.

[21] Appl. No.: 336,378

[22] Filed: Apr. 11, 1989

[51] Int. Cl.$^5$ ............................................. B65G 15/00
[52] U.S. Cl. ................................ 198/408; 198/465.1; 198/470.1; 264/238; 264/297.1; 414/416; 425/348 S
[58] Field of Search .................. 198/408, 418.1, 470.1, 198/465.1; 264/238, 297.1; 425/348 S, 442; 414/411, 416

[56] References Cited
U.S. PATENT DOCUMENTS 3,570,647  3/1971  Meikle et al. ................ 198/470.1 X
3,601,242  8/1971  Reinemuth et al. .......... 198/483.1 X
3,797,683  3/1974  Simpatico ........................... 414/404
3,866,737  2/1975  Simon ........................... 198/483.1 X
4,051,878  10/1977 Ohmeis et al. .................. 141/150 X
4,735,761  4/1988  Lindenberger ................. 198/408 X Primary Examiner—Robert P. Olszewski
Assistant Examiner—Cheryl L. Gastineau
Attorney, Agent, or Firm—S. Michael Bender

[57] ABSTRACT

Apparatus and method for extracting tubular articles from their molds and inserting them into corresponding workpiece holders comprising a first orienting device for delivering the molded tubular articles in their molds to a first conveyer whereupon the axis of each mold and the tubular article therein has been rotated 90°, i.e. from an upstanding position to a horizontal position; a second conveyer moving in synchronism with said first conveyer for carrying a series of workpiece holders disposed horizontally and in axially opposed alignment with respect to the molds on said first conveyer; a transfer device for extracting the articles from their molds while in the horizontal position and inserting them in inverted fashion into corresponding workpiece holders along a direction parallel to the longitudinal axis of each mold as first and second conveyers move in synchronism, and a second orienting device for receiving the workpiece holders from said second conveyer and for returning them to an upright position.

9 Claims, 14 Drawing Sheets

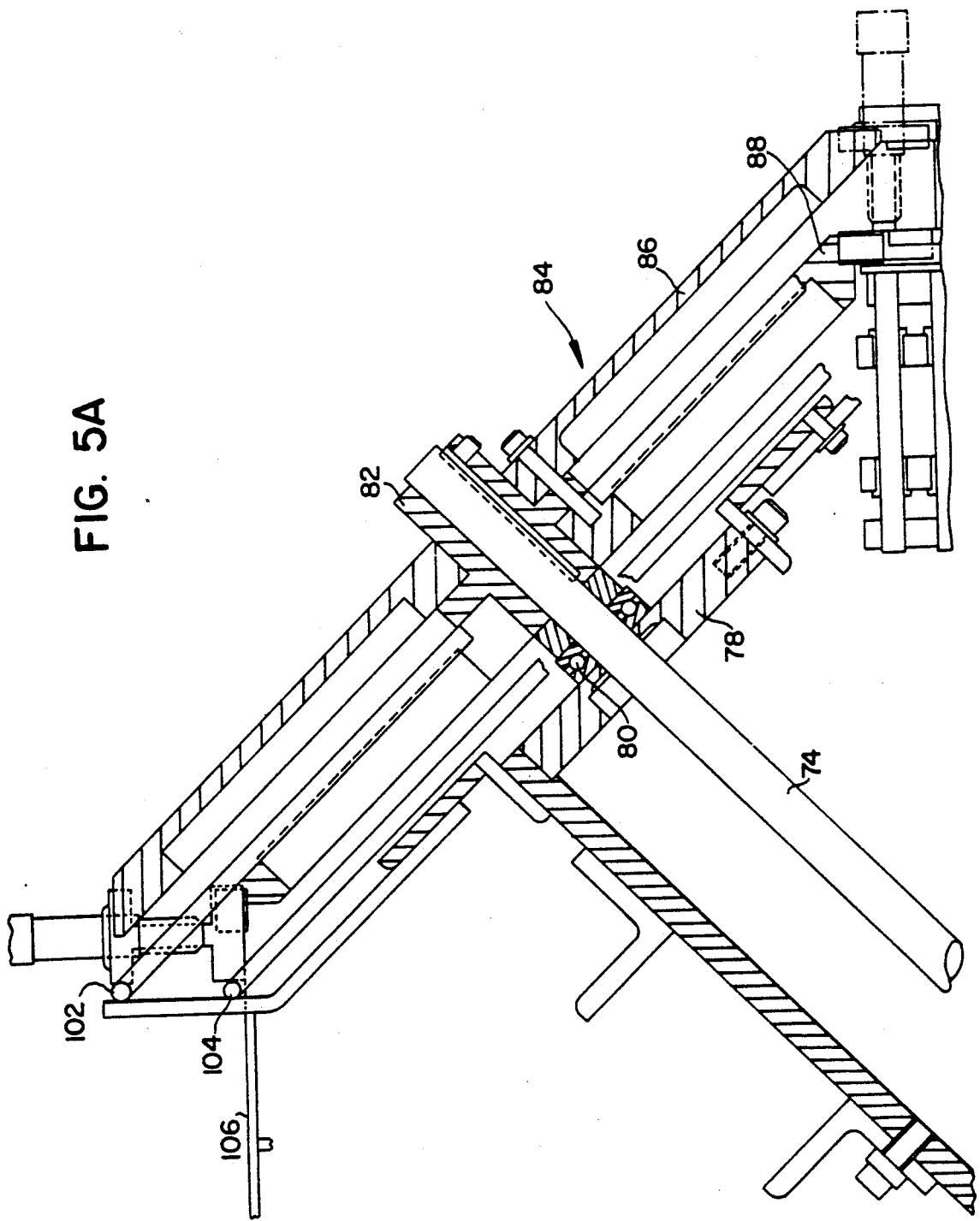

APPARATUS AND METHOD FOR EXTRACTING TUBULAR ARTICLES

TECHNICAL FIELD

The present invention relates generally to an apparatus and method for manufacturing molded tubular articles such as, for example, molded tubular cosmetic articles known as "pomades" or "lipsticks." The present invention more particularly relates to an improved apparatus and method for automatically extracting such tubular articles from a series of molds and inserting the articles into a corresponding series of workpiece holders so that the articles may, in turn, be finish processed.

BACKGROUND ART

U.S. Pat. No. 3,797,683 describes an automatic apparatus for extracting molded articles such as pomades or lipsticks from their molds and inserting them into corresponding workpiece holders for further processing. In the patented apparatus, a turret having a series of cam activated transfer devices in the form of separate pairs of movable jaws, respectively, rotates in synchronism with the molds moving on a conveyor. After each pair of jaws is cammed to grasp an article in its mold, the transfer device is raised on the turret separating the tubular article from the mold. The raised transfer device then is rotated 180° on its axis as the turret continues to spin about its rotational axis. Finally, the transfer device is lowered to position the article in its 180° rotated position in a holder on a second conveyor for further processing.

While the patented apparatus has proven quite successful in actual practice, it still suffers from certain disadvantages. The required 180° rotation of each transfer device during turret rotation necessitates a relatively large turret having many radially directed transfer devices. This, in turn, leads to a bulky apparatus requiring a large amount of floor space. In addition, the need to rotate each transfer device 180° as the turret rotates requires a relatively complicated apparatus. This not only leads to high initial cost, but furthermore, greater than expected running costs due to more downtime for repair and adjustment than is otherwise desired.

Against the foregoing background, it is an object of the present invention to provide an improved apparatus and method for automatically extracting molded articles from their molds and inserting them into corresponding workpiece holders for further processing. It is yet another object of the present invention to provide an improved apparatus and method of the foregoing type that is relatively compact in size and reliable in operation.

DISCLOSURE OF THE INVENTION

Toward the accomplishment of these and additional objects and advantages, the present invention, briefly described, comprises first orienting means for delivering molded tubular articles in their molds to first conveyer means whereupon the axis of each mold and the tubular article therein has been rotated 90°, i.e. from an upstanding position to a horizontal position; second conveyer means moving in synchronism with said first conveyer means for carrying a series of workpiece holders disposed horizontally and in axially opposed alignment with respect to said molds on said first conveyer means; transfer means for extracting the articles from their molds while in the horizontal position and inserting them in inverted fashion into corresponding workpiece holders along a direction parallel to the longitudinal axis of each said mold as said first and second conveyer means move in synchronism, and second orienting means for receiving the workpiece holders from said second conveyer means and for returning them to an upright position.

BRIEF DESCRIPTION OF DRAWING

Still further objects and advantages of the present invention, as well as a more complete understanding of same, will become more apparent from a study of the following detailed description of the preferred embodiments thereof in connection with the accompanying drawings wherein:

FIG. 5A is a partial sectional view in elevation showing a portion of the apparatus of the invention;

FIG. 5E is a diagram showing the relationship among FIGS. 5A-5D;

BEST MODE OF CARRYING OUT INVENTION

Figure 1:
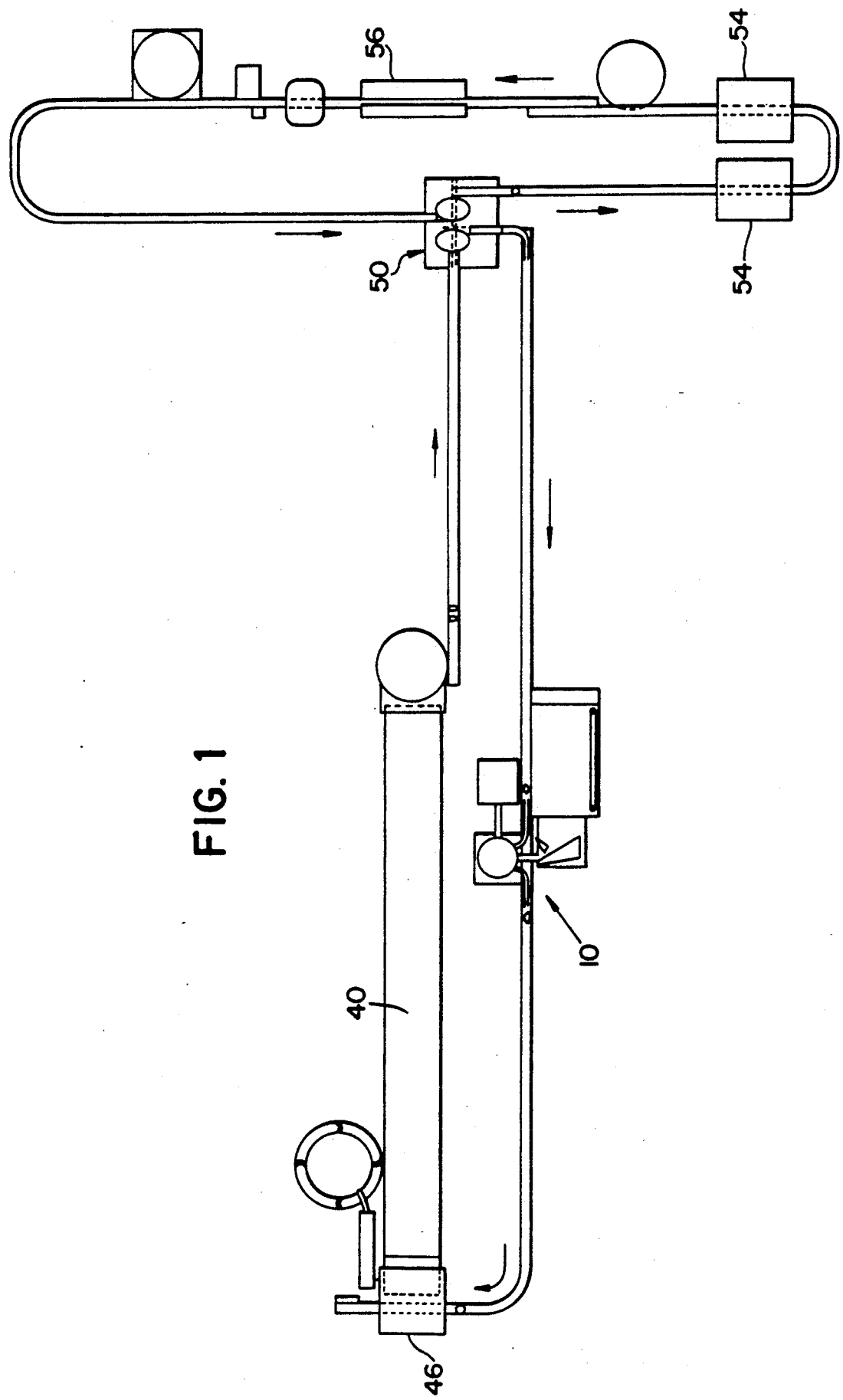
FIG. 1 is a schematic diagram in plan view of an automated lipstick line incorporating the apparatus of the present invention.
Figure 2:
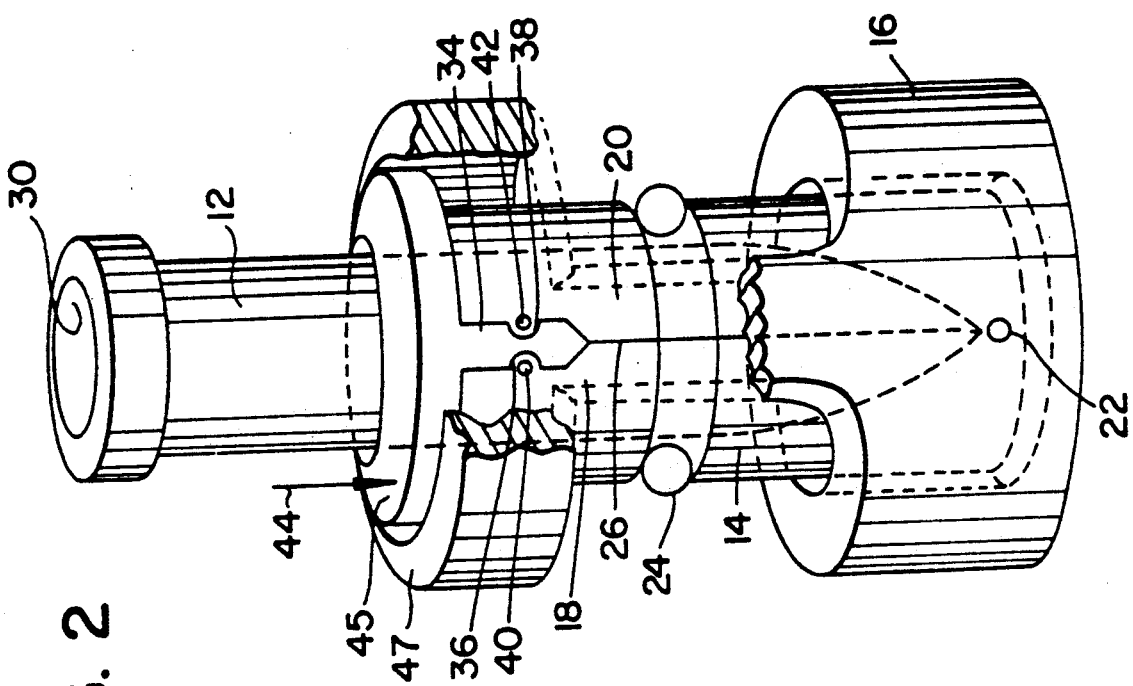
FIG. 2 is a perspective view partially broken away showing the preferred form of mold support unit utilized in the apparatus of the present invention.

Turning initially to FIGS. 1-4, the apparatus of the present invention, in its preferred form, may advantageously be used in an automated line for making tubular articles such as pomades or lipsticks. A typical line is diagrammatically depicted in FIG. 1 and comprises a first station 10 where unfilled pomade or lipstick containers 12 are placed in a mold 14 carried in a mold support unit 16 as more particularly illustrated in FIG. 2.

Preferably mold 14 consists of a pair of identical mold sections 18, 20 hinged together by a pin 22 mounted in the base of mold support unit 16 substantially as depicted. The two mold halves 18, 20 normally are maintained in a closed condition by the action of circumferential spring 24, but may split or separate along parting line 26 against the action of spring 24 to effect release of container 12 and any molded pomade 28 inside the container 12 and the mold 14. A hole 30 provided in the base of container 12 permits insertion of a feed tube for charging the interior of the mold and the container with molten pomade as is well known and more fully described in U.S. Pat. No. 4,051,878, the disclosure of which is hereby incorporated herein.

Thus, it will be understood that container 12 is supported in its mold/mold support unit upside down or "bottom up." A depressible ring 32 floats above the mold Sections 18, 20 by means of a pair of diametrically opposed downwardly depending arms 34 (only one of which is shown). Each arm has a pair of opposed notches 36, 38 for receiving a corresponding pair of pins 40, 42 fixed to each mold section, respectively, as shown. The action of circumferential spring 24 normally causes the pins to seat within their corresponding notches thereby maintaining the ring 32 in its normal floating condition. However, downward movement of the ring 32 as indicated by arrow 44 will cause the opposed edges of each arm to cam the pins 40, 42 apart thereby causing the mold sections 18, 20 to separate along parting line 26 by pivoting relative to each other about the axis defined by pin 22, thus opening the mold for release of container 12 and molded pomade 28. It will be understood that in the closed position of the mold when the pins 40, 42 are seated within their corresponding notches 36, 38, the top surface 45 of ring 32 extends above top surface 47 of mold support unit 47 a sufficient distance so that when ring 32 is depressed in the direction of arrow 44 and brought flush with surface 47, arms 34 have completed cammed apart pins 40, 42.

Returning to FIG. 1, empty containers 12 in their separate molds 14 and mold support units 16 are caused to move along a suitable conveyer in the upright position (FIG. 2) to station 46 where the containers and the molds are filled with hot liquid pomade as disclosed, for example, in U.S. Pat. No. 4,051,878, supra. After filling, the mold support units are passed through a cooling tunnel and then delivered, in the upright position of FIG. 2, to the extractor apparatus of the present invention generally indicated by reference numeral 50.

Figure 3:
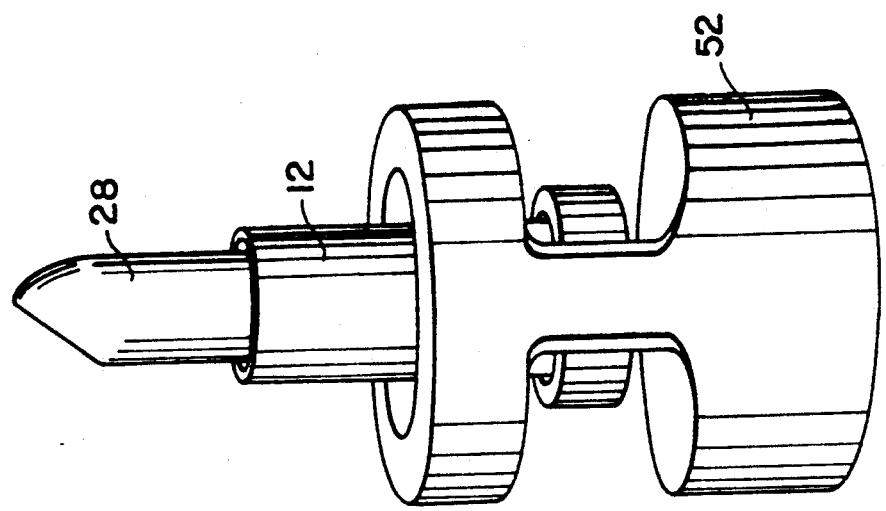
FIG. 3 is a perspective view showing the preferred form of workpiece holder utilized in the apparatus of the present invention.

In accordance with the present invention, the function of extractor apparatus 50 is to automatically remove (extract) the filled containers 12 with their molded pomades 28 from the molds 14 and mold support units 16, and insert same into corresponding workpiece holders 52 in the inverted position substantially as shown in FIG. 3; that is, with the workpiece holders and the pomade portions of the articles being in the upright position so that the articles may be conveyed to stations 54 and 56 (FIG. 1) for further processing. For example, at station 54 the pomade 28 may be "flashed," whereas at station 56 the container 12 may be capped, removed from its workpiece holder 52, and packaged. The empty workpiece holders 52 are then recycled by being conveyed back to extractor 50.

Figures 4, 5:
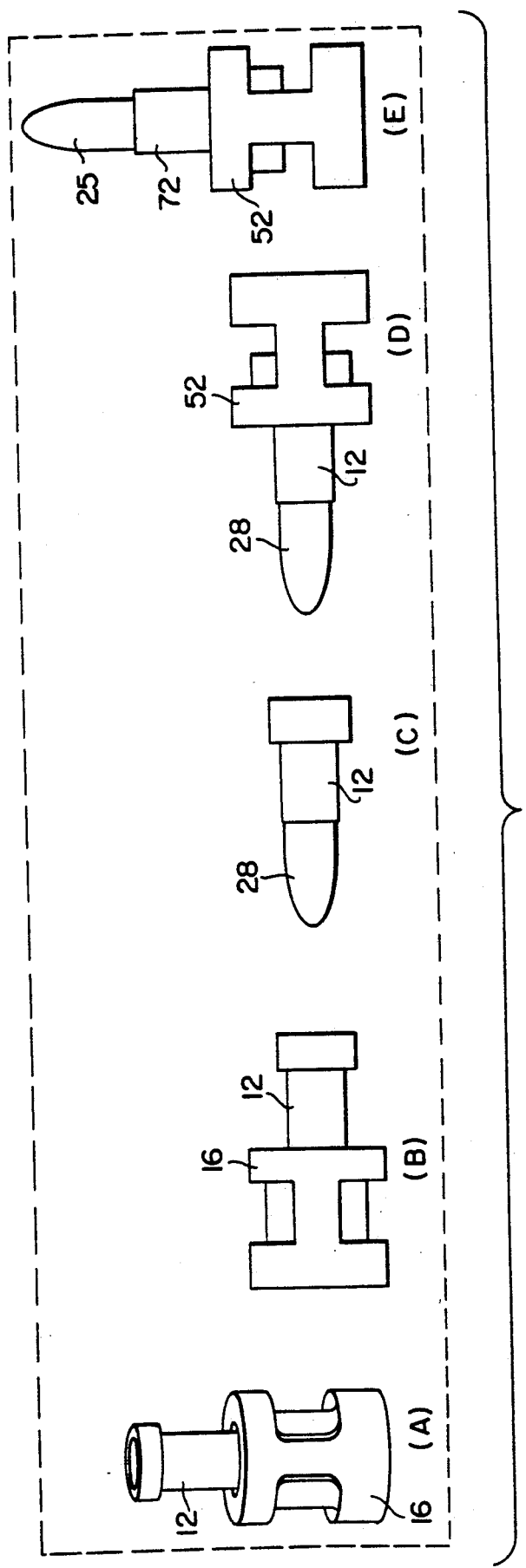
FIG. 4 is a schematic diagram showing how the orientation of the mold support unit and workpiece holder respectively are changed during operation of the apparatus of the present invention.

Turning to FIG. 4, it will be appreciated that when the lipstick line of FIG. 1 is operational, a continuous series of mold support units 16 are delivered to extractor 50 in the upright position with container 12 and pomade 28 facing downward in the "mold" or "bottom up" position (position (A)), and exit extractor 50 in their corresponding workpiece holders in the aforementioned upright, inverted position (position (E)).

Thus, in accordance with the present invention and as merely schematically illustrated in FIG. 4, extractor 50 is adapted to perform the following functions in the indicated sequence: i) reorient the mold support units from their original upright position to a horizontal position (position (B), FIG. 4); ii) extract each container from its mold and mold support unit and insert same into a corresponding workpiece holder by movement of the container along a direction parallel to the longitudinal axis of the container so that the container is seated within the workpiece holder with the pomade portion thereof freely extending to the left (positions (B), (C) and (D), FIG. 4), and iii) reorient the container 12 and pomade 28 in its workpiece holder 52 from the horizontal position to the upright position (positions (D) and (E), FIG. 4). As a result of performing these functions continuously in ah automatic manner on a succession of units, extractor apparatus 50 continuously discharges empty mold support units 16 which may then be recycled by being conveyed back to station 10 (FIG. 1). It is thus seen that by virtue of extractor apparatus 50, an efficient, fully automatic lipstick manufacturing is provided.

Referring now to FIGS. 5A-5D, which are to be arranged in accordance with the diagram of FIG. 5E, the details of the preferred form of extractor apparatus 50 now will be described.

A main drive shaft 60 is adapted for rotation in a clockwise direction about a central horizontal axis 62 as by being mounted in a pair of spaced posts or stanchions 64, 66 having suitable bearing assemblies. The posts form part of the structural framework of the apparatus which is not shown except where believed necessary to avoid confusing the drawings. A sprocket wheel 68 splined to shaft 60 outboard of post 64 transmits torque to the shaft from a conventional electric motor, preferably of the a.c. type, via suitable reduction gearing and a chain drive (not shown). A conventional motor control circuit may be provided to vary the rotational speed of shaft 60, it being understood that the details of the electric motor, reduction gearing, chain sprocket drive and control circuit are well known and form no part of the present invention.

A first bevel gear 70 fixed to shaft 60 meshes with a second bevel gear 72 which latter is fixed at one end to an axle 74 mounted for rotation at a 45° angle with respect to the axis 62 of shaft 60. Axle 74 is supported by a pair of spaced plates 76, 78 attached to the frame of the apparatus, and extends beyond thrust bearing 80 to receive the hub 82 of a starwheel 84 fixedly attached to the axle by means of a conventional keyway and set screw substantially as shown in FIG. 5A.

Figure 6:
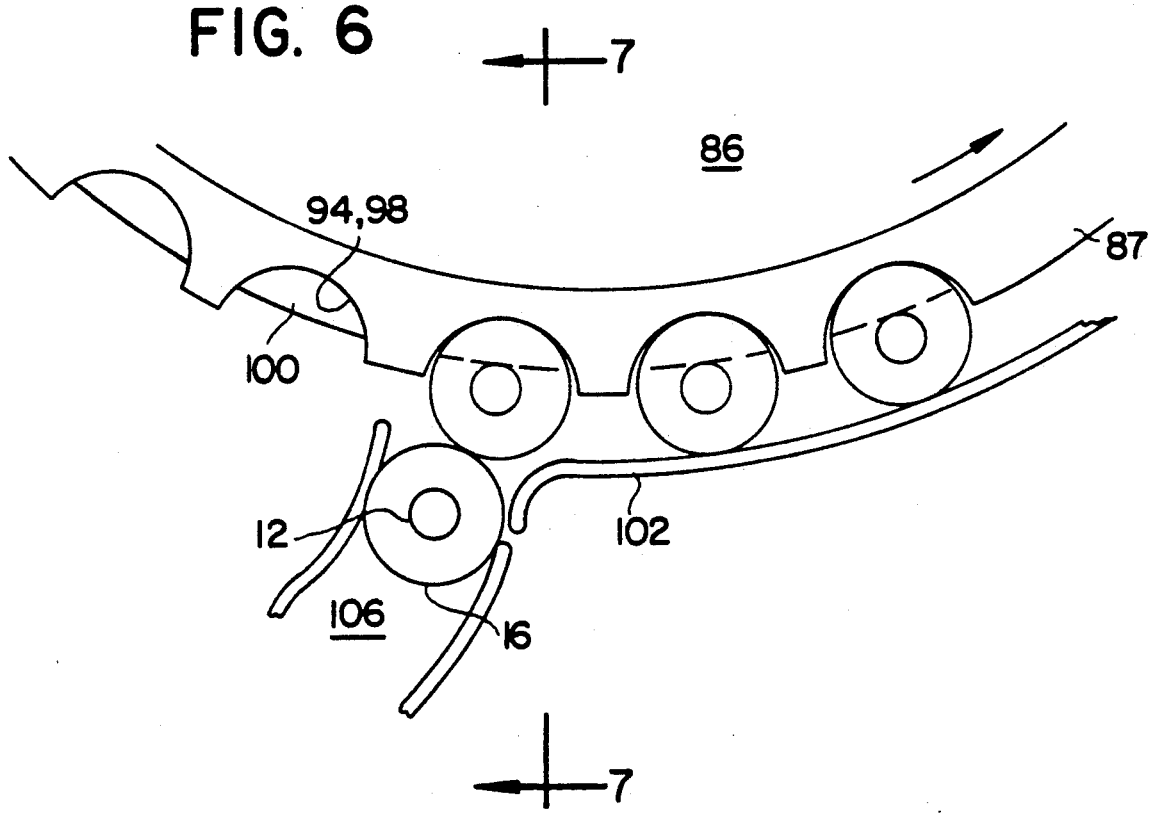
FIG. 6 is an enlarged detail in plan view showing the edge geometry of the starwheel portion of the apparatus of the present invention.
Figure 7:
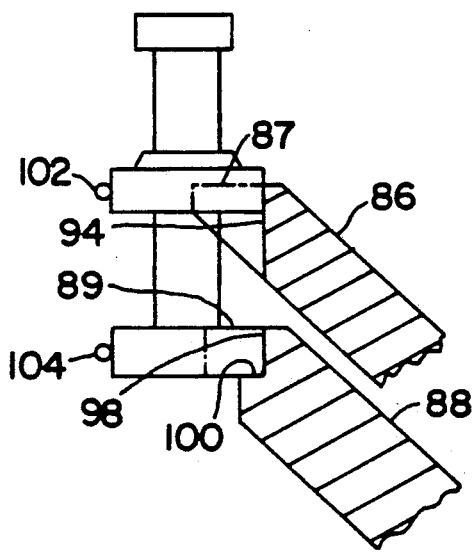
FIG. 7 is an enlarged detail partly in section taken along line 7—7 of FIG. 6.

Starwheel 84 comprises a pair of spaced confronting disks 86, 88 fastened to hub 82 and each other by a series of screw fasteners. As more clearly seen in FIGS. 6 and 7, the edges of disks 86, 88 terminate in beveled sections 87 and 89, respectively, into which a series of evenly spaced arcuate cutouts or notches are formed extending completely around the circumference of the starwheel thereby giving the appearance of a "saw tooth" configuration. Beveled edge 87 of upper disk 86 has a series of arcuate cutouts each defining a vertical wall or bearing surface 94 whereas beveled edge 89 of lower disk 88 has a series of arcuate cutouts each defining a vertical wall 98 and a horizontal surface or floor 100. Together wall 94, wall 98 and floor 100 define a notch or arcuate recess complimentary to the shape of a mold support unit 16. Thus, as best seen in FIG. 7, arcuate cutout surface 94 is adapted to engage the sidewall of the mold support units' upper portion; surface 98 is adapted to engage the sidewall of the support units' lower portion, and floor surface 100 is adapted to engage the bottom surface of each mold support unit.

Confronting the peripheries of disks 86, 88 is a circumferentially extending pair of guide rails 102, 104 forming a retaining wall spaced from, but parallel to the wall defined by surfaces 94, 98. Thus, as shown in FIGS. 5A, and 6, a succession of mold support units 16, positioned upright on conveyer platform 106, which latter is level with floor 100, is adapted to be moved one-by-one into engagement with successive notches or arcuate recesses in beveled edges 87, 89 as starwheel 84 rotates through its top dead center position. Accordingly, as shaft 60 rotates clockwise and starwheel 84 is caused to rotate counterclockwise through the action of gears 72, 76 and axle 74, mold support units 16 (and their containers 12) will be "picked up" from supply platform 106 one after another and carried along rails 102, 104 by the action of the arcuate cutouts in the starwheel peripheral edge until they successively assume a new position at the bottom dead center position of the starwheel. There, it will be observed, the orientation of each mold support unit 16 (and any container 12 and pomade 28 therein) is horizontal or parallel to axis 62 and both the container 12 and the mold support unit 16 extend toward the right as viewed in FIG. 5A.

Figure 8:
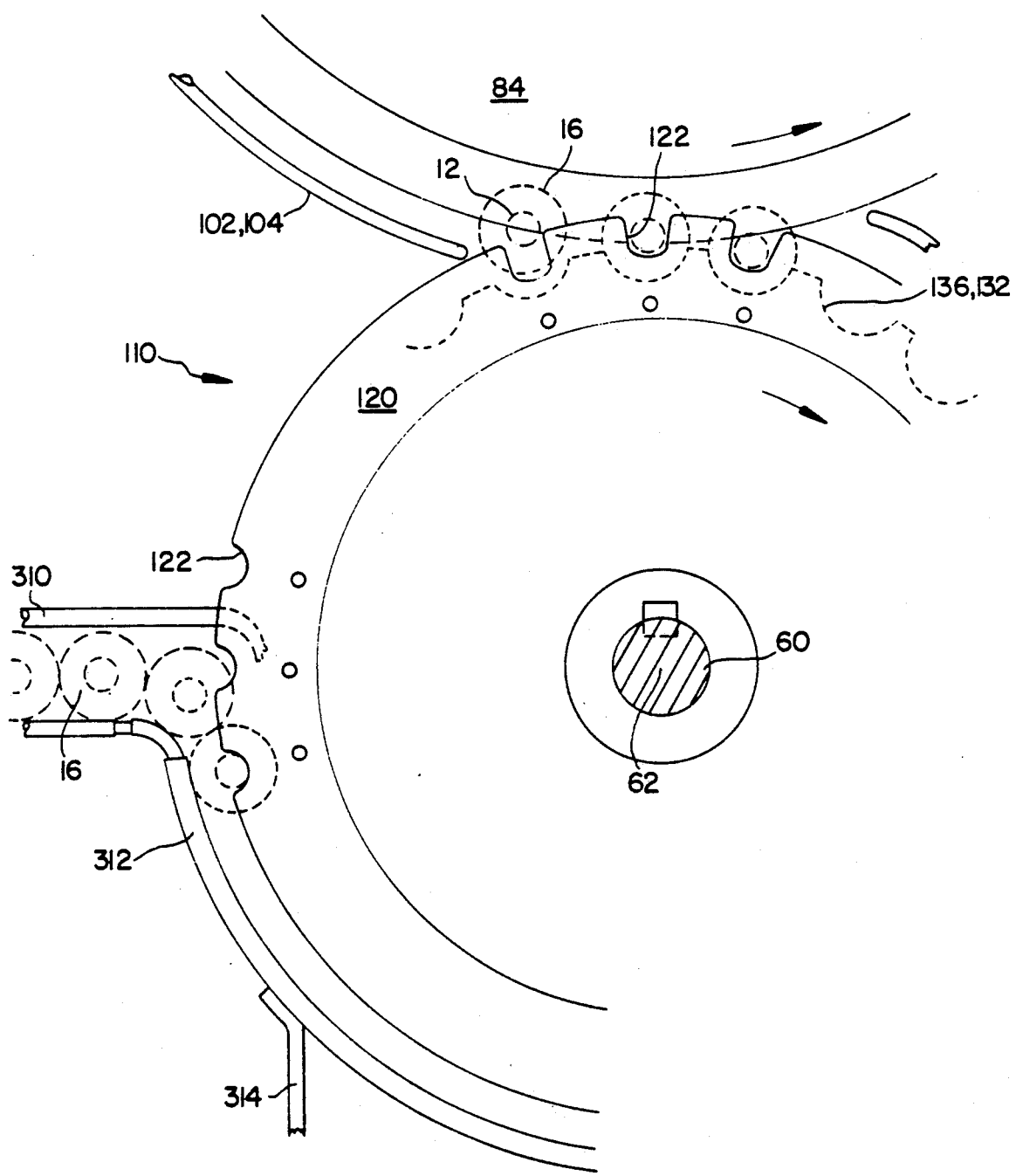
FIG. 8 is a sectional view in elevation taken along line 8—8 in FIGS. 5A and 5B.

In their reoriented position, as shown in FIG. 8, mold support units 16 (including container 12 and pomade 28) are adapted to be delivered by the rotating starwheel 84 one-by-one to respective arcuate shaped receptacles or notches located on the outer periphery of receiving drum 110 which is mounted for rotation on shaft 60 in synchronism with the rotation of starwheel 84. Hence, as drum 110 move clockwise, mold support units from starwheel 84 successively fall by gravity into corresponding arcuate receptacles made available at the top dead center position of drum 110. In this connection, it will be noted that drum 110 preferably carries the same number of evenly spaced arcuate receptacles on its periphery as does starwheel 84.

Figure 5B:
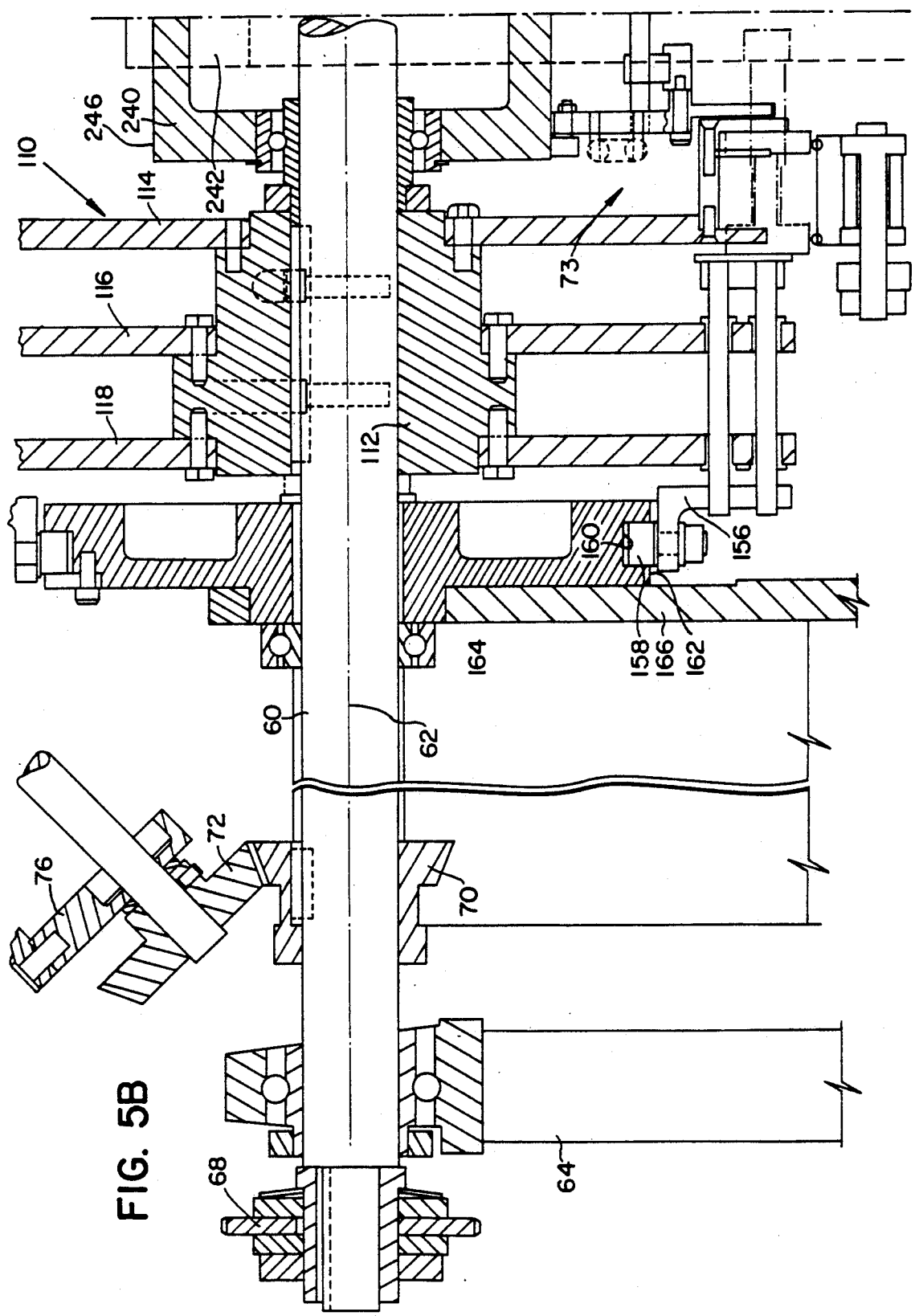
FIG. 5B is a partial sectional view in elevation showing a portion of the apparatus of the invention.

The receiving drum 110 comprises a hub 112 fixedly secured to shaft 60 by means of a conventional keyway and set screw. A series of three spaced, circular plates 114, 116, and 118 is fixedly mounted to the hub by means of screw fasteners substantially as shown in FIG. 5B. Spaced evenly about the entire periphery of drum 110 (i.e. plates 114, 116, and 118) is the aforementioned series of arcuate receptacles or notches each having a mold-opening cam associated therewith as will now be described in greater detail with further reference to FIG. 9.

An end wall 120 having a arcuate cutout 122 and a vertical bearing surface 124 is fixedly secured to a spacer member 126 which, in turn, is fixedly attached to a reduced wall section 128 of circular plate 114 defined by circumferentially extending shoulder 130. Reduced wall Section 128 has an arcuate cutout 132 whereas a partition 134 spaced proximal to vertical bearing surface 124 between the latter surface and reduced wall section 128 also has an arcuate cutout 136. Arcuate cutouts 132 and 136 define axially spaced horizontal bearing surfaces adapted to engage the side of horizontally oriented mold support unit 16 received in each arcuate receptacle. Vertical wall surface 124 which also is arcuately shaped (see FIG. 8) defines a bearing surface for the top surface of floating mold ring 32 as will be more fully discussed below.

A cylindrically shaped plunger 140 is provided defining a vertical bearing surface 142 engageable with the bottom surface of horizontally disposed mold support unit 16 substantially as shown. Plunger 140 is fixed to a pair of push rods 144, 146 supported for axial displacement in bushings 148, 150 and 152, 154 disposed in circular plates 116, 118 near the peripheral extremities thereof. Rods 144, 146 have their left-most free ends fixed to an L-shaped cam follower 156 which, in turn, has a cam roller 158 seated in a groove 160 defining a camming surface for actuating push rods 144, 146 and plunger 140.

Figure 9:
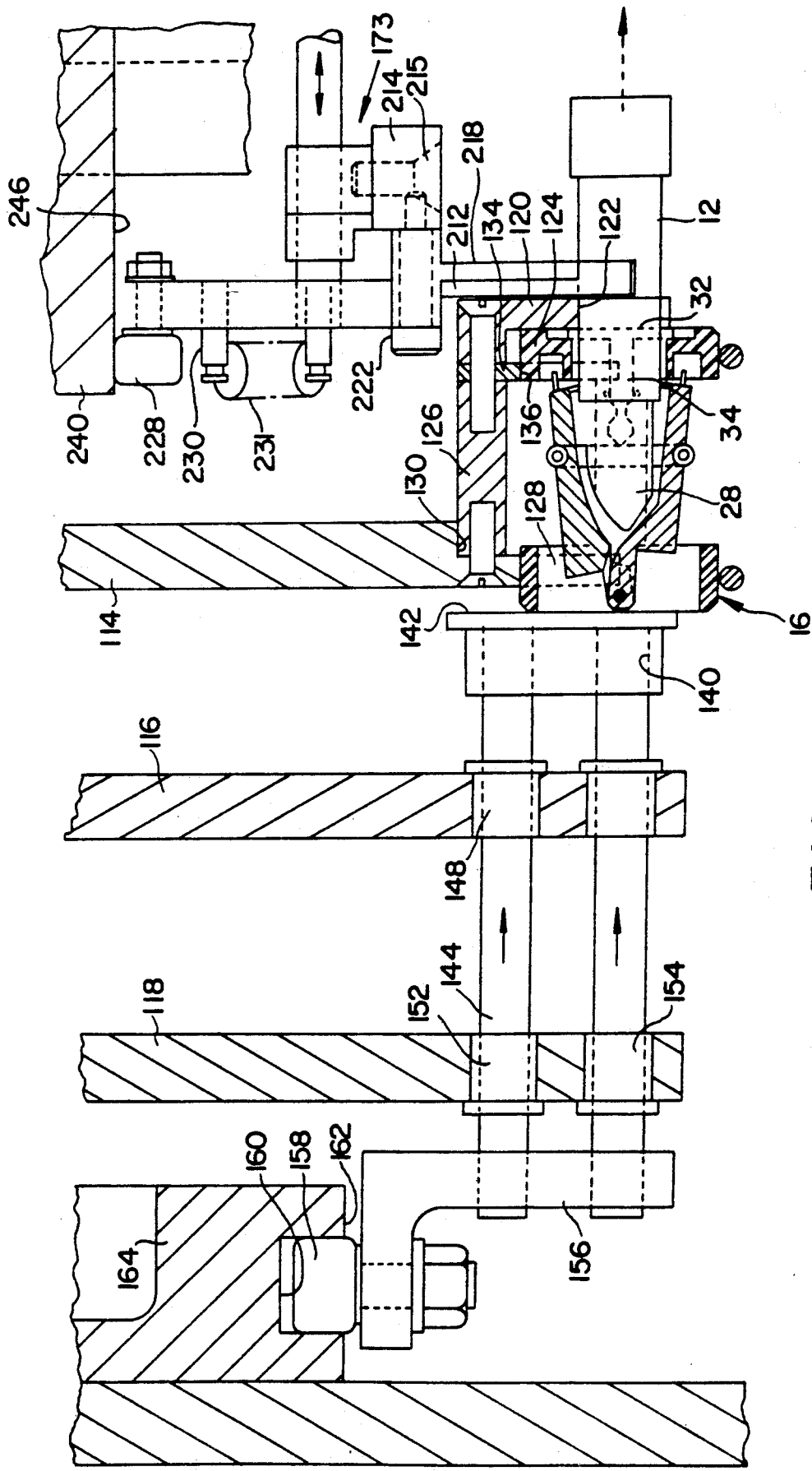
FIG. 9 is an enlarged detail of a portion of FIG. 5B.
Figure 12:
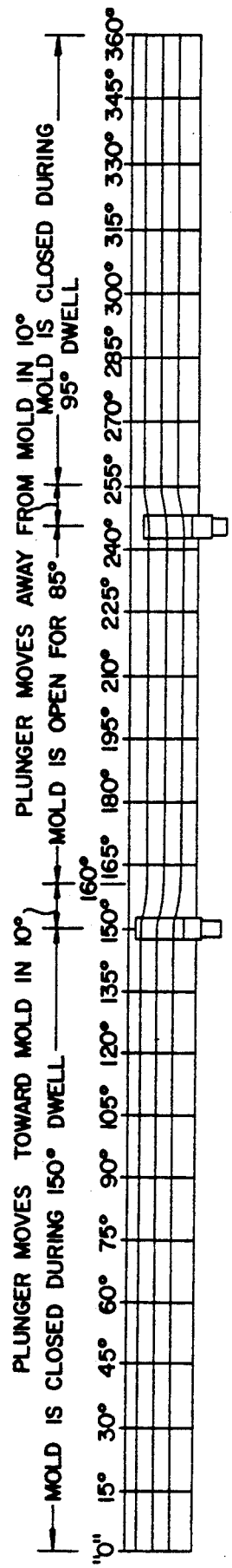
FIG. 12 is a diagram showing the cam profile of the mold opening cam of the present invention.

Groove 160 is disposed in surface 162 of a cylindrical drum 164 axially positioned on shaft 60 immediately adjacent drum 110, but fixed with respect to the apparatus framework via a suitable bracket member 166. Hence, shaft 60 and drum 110 attached to shaft 60 through hub 112, both rotate relative to fixed camming drum 164 (see FIG. 5B). The axial position of groove 160 in surface 162 of drum 164 and therefore the axial position of push rods 144, 146 is made to vary along circumferential surface 162 in accordance with the cam profile shown in FIG. 12. Thus, for example, at 0°, corresponding to top dead center of fixed drum 164 in FIG. 5B, cam follower 156, and therefore, push rods 144, 146 and plunger 140 are at their extreme left-most position. As drum 110 rotates relative to fixed cylindrical drum 164 however, and approaches bottom dead center, i.e. at about 150°, the position of groove 160 in surface 162 gradually shifts to the right (FIG. 5B) thereby driving cam roller 158 to the right. As best seen in FIG. 9, this camming action results in push rods 144, 146 and plunger 140 advancing to the right causing surface 142 to engage the bottom of mold support unit 16 urging it to the right relative to floating ring 32 which is retained by arcuate vertical bearing surface 124. As a result, mold halves 18, 20 are opened by the action of arms 34 camming apart pins 40, 42. The cam profile of FIG. 12 is such as to maintain this "open mold" condition for about the next 90° of rotation relative to drum 164. This corresponds generally to the bottom dead center portion of the rotation cycle of drum 110; hence, each mold support unit 16 carried in the peripheral arcuate receptacles on rotating drum 110 will have its mold maintained in the open condition by the camming action of groove 160, push rods 144, 146, plunger 140, and bearing surface 124, as that receptacle rotates through bottom dead center.

It will thus be appreciated that during a prescribed phase of angular rotation of drum 110, and of each mold support unit 16 carried peripherally in its arcuate receptacle on drum 110, the mold in that particular mold support unit will be maintained open thereby facilitating extraction of container 12 and pomade 28 from that mold support unit. In addition, the action of plunger 140 engaging the mold support unit during the "open mold" phase firmly and securely maintains the mold support unit fixed in its receptacle and free from rotation therein thereby further facilitating withdrawal of container 12 from its corresponding mold and mold support unit as will be described in more detail below.

In accordance with the present invention, extraction of each container 12 from its mold and mold support unit (and insertion of container 12 into a corresponding workpiece holder in inverted fashion) is accomplished by individual transfer units generally designated by reference numberal 170. A separate transfer unit 170 is provided corresponding to each arcuate receptacle on drum 110 with the transfer units being supported for synchronous rotation relative to drum 110 by means of a transfer drum 176 located to the right of drum 110 on shaft 60 as viewed in FIG. 5C.

Transfer drum 176 comprises a pair of axially spaced circular plates 178, 180 fixedly secured to a hub 182 which, in turn, is fixedly secured to shaft 60 by a conventional keyway and set screw. The peripheral edge or radially distal end of plate 178 carries a circumferential array of separate arcuate receptacles corresponding to the arcuate receptacles on plate 114 of drum 110, i.e. drum 176 has the same number of evenly spaced peripheral arcuate receptacles as does drum 110 and each arcuate receptacle on plate 178 is disposed in axial alignment with a corresponding arcuate receptacle on plate 114 of drum 110. The receptacles on plate 178 however, are designed to accommodate a workpiece holder 52 in horizontal disposition with the latter's open end or mouth confronting an opposed corresponding mold support unit 16 carried in a corresponding arcuate receptacle on the periphery of drum 110.

Figure 10:
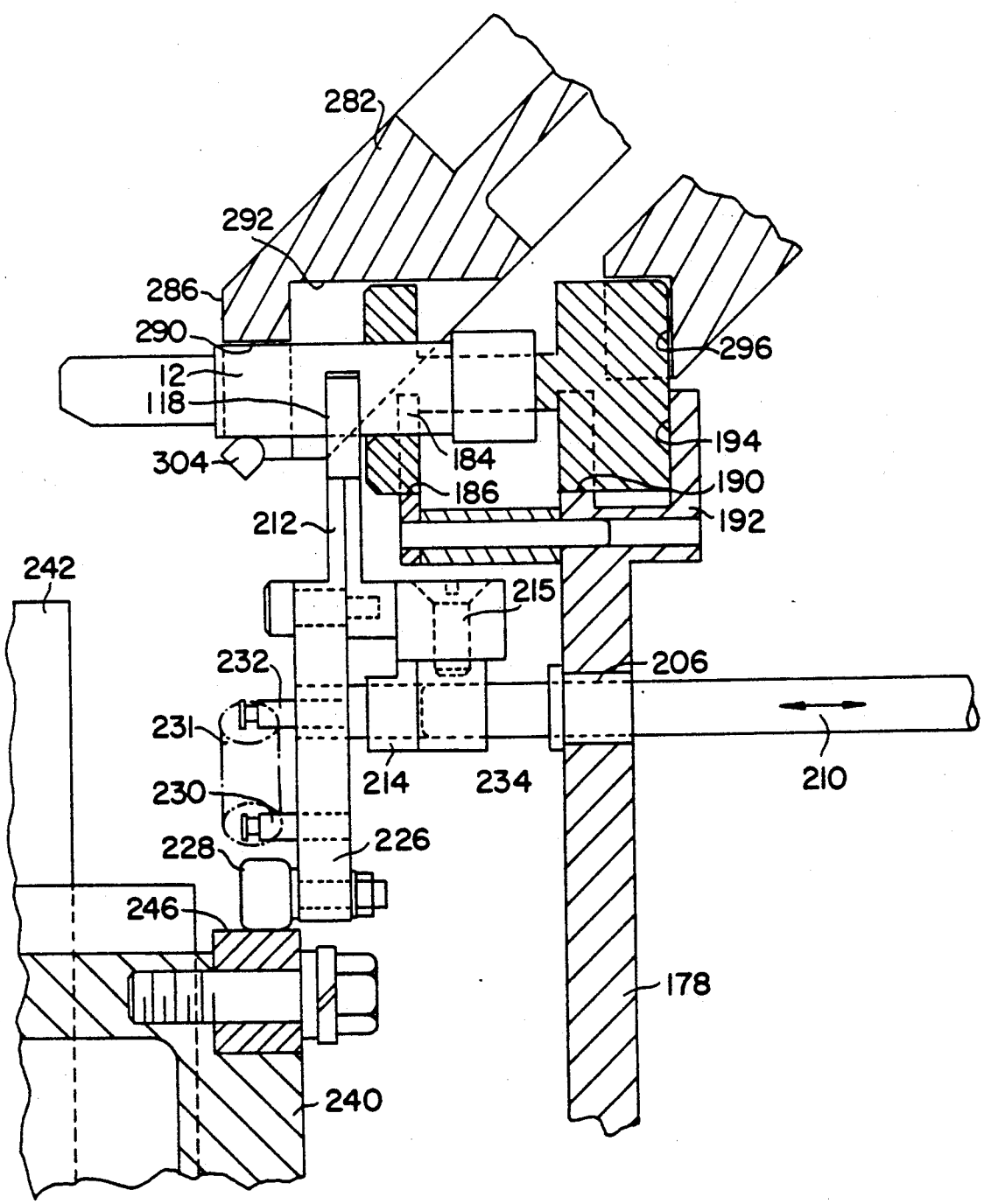
FIG. 10 is an enlarged detail of a portion of FIG. 5C.

Thus, as best seen in FIG. 10, end plate 184 has an arcuate cutout 186 defining a bearing surface for engagement with the side wall of workpiece holder 52 with the end plate being secured to spacer member 188 which, in turn, is secured to the distal end of plate 178 proximal to arcuate cutout 190, the latter defining a second bearing surface adapted to engage the sidewall of the base of the horizontally disposed workpiece holder 52. An end wall extension 192 also secured to the distal end of plate 178 substantially as shown also is provided to define a vertical bearing surface 194 adapted to engage the bottom surface of the horizontally disposed workpiece holder 52.

Figure 11:
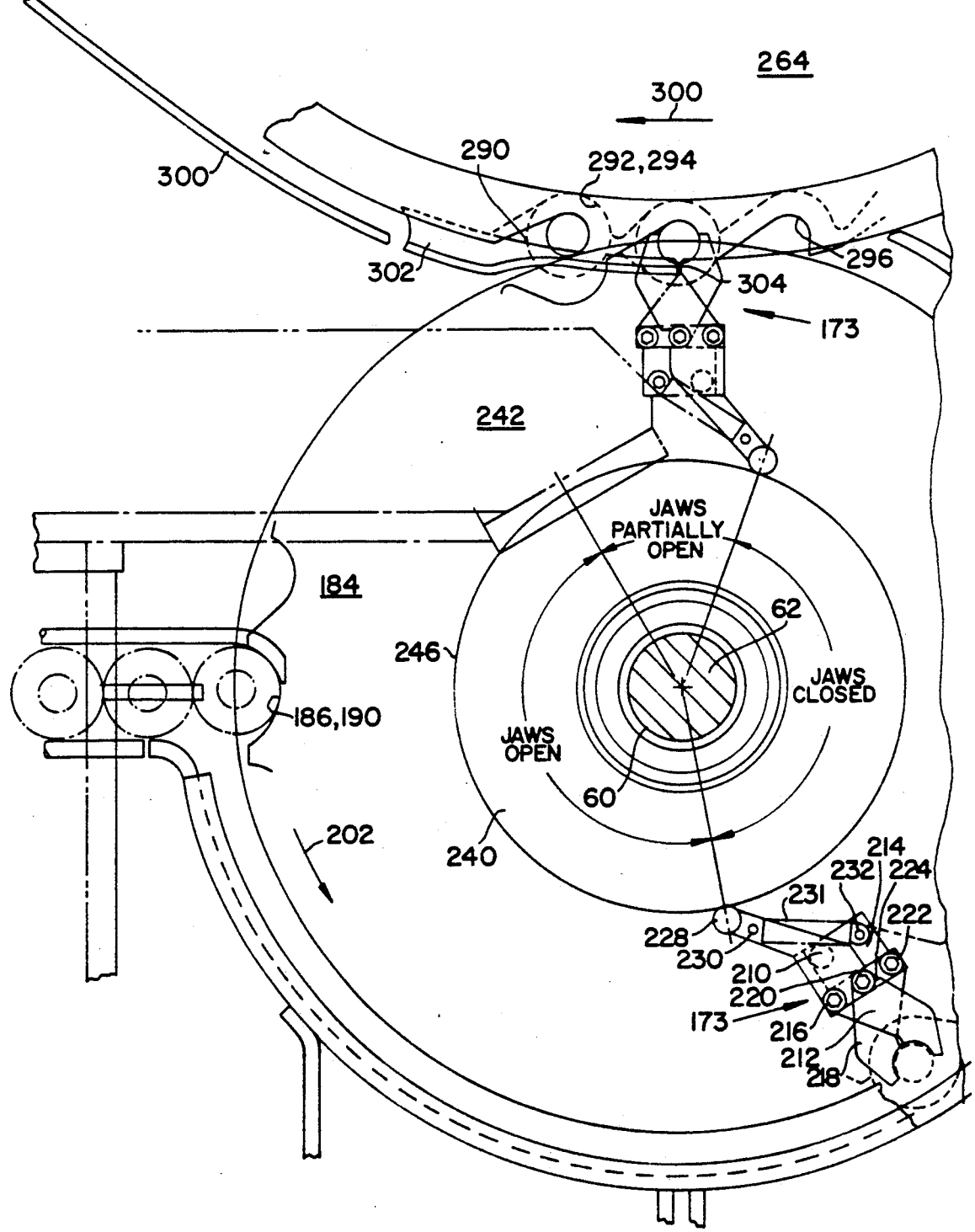
FIG. 11 is a sectional view in elevation taken along line 11—11 in FIGS. 5B and 5C.

As viewed in FIG. 11, and as in the case of starwheel 84 and drum 110, the arcuate cutouts 186, 190 define a circular "saw tooth" pattern with the spaces between the teeth forming separate arcuate receptacles for receiving therein respectively separate, horizontally disposed workpiece holders, i.e. the axis of each receptacle is parallel to axis 62 of shaft 60. Empty workpiece holders are continuously supplied to the transfer drum 176 with their longitudinal axes horizontal and parallel to axis 62 of shaft 60 via guiderails 196, 198 supported on the apparatus framework by bracket 200. As drum 176 rotates on shaft 60 through its 3:00 o'clock position (see FIG. 11), successive empty workpiece holders are picked up by successive corresponding arcuate receptacles and caused to rotate one-by-one on the periphery of drum 176 in the direction of arrow 202. Rail 198 extends circumferentially with respect to the periphery of drum 176 from about the 3:00 o'clock position to about top dead center and functions to maintain the workpiece holders securely seated in the corresponding arcuate receptacles as drum 176 rotates relative to axis 62.

The empty, horizontally disposed workpiece holders are thus transported one after another in the direction of arrow 202, i.e. toward the bottom dead center position of drum 176 where, in accordance with the invention, direct axial transfer of each container from its mold support unit carried on drum 110 to an awaiting corresponding opposed workpiece holder carried on drum 176 commences via phased actuation of transfer unit 170 associated therewith as will now be described.

Figure 5C:
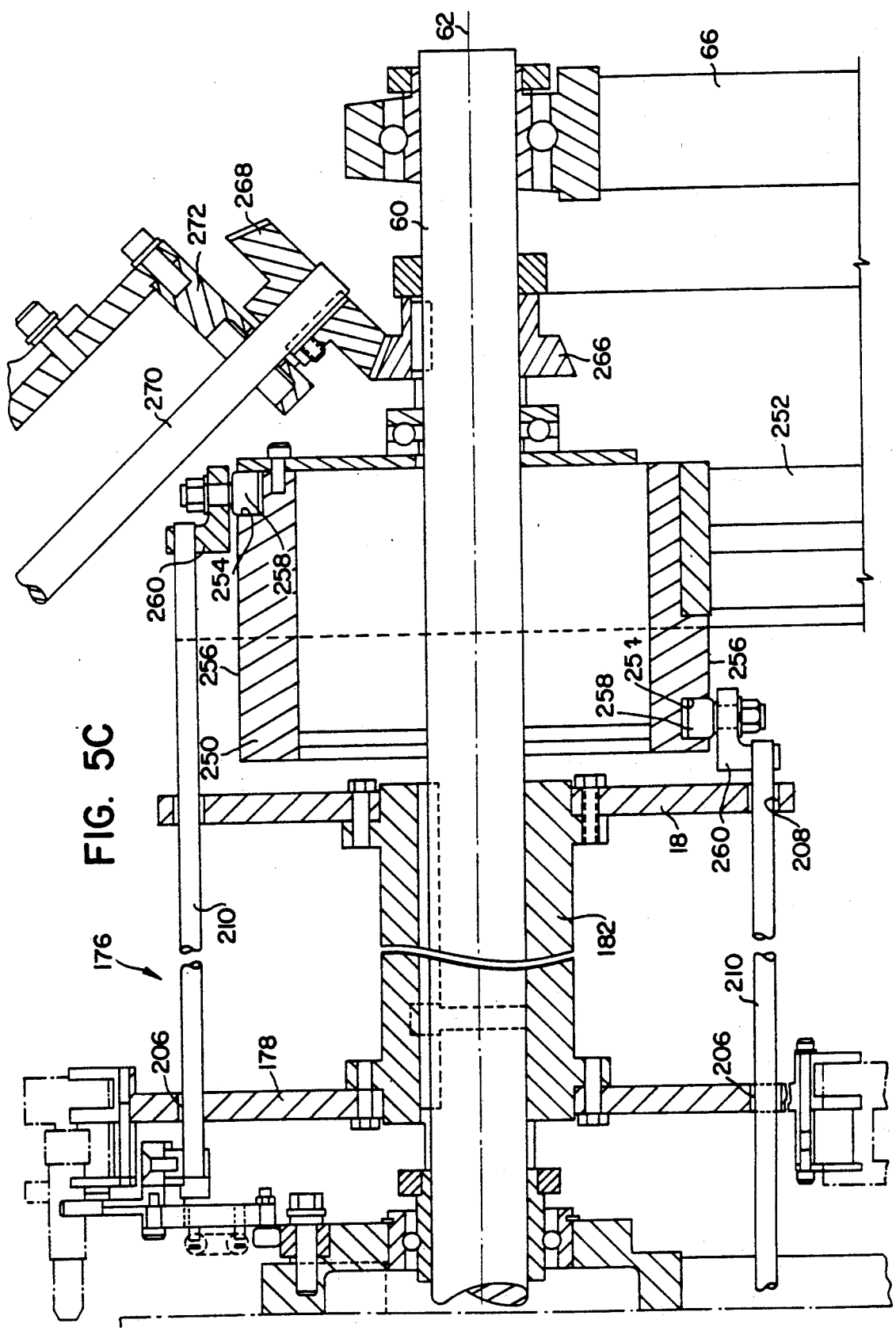
FIG. 5C is a partial sectional view in elevation showing a portion of the apparatus of the invention.
Figure 5D:
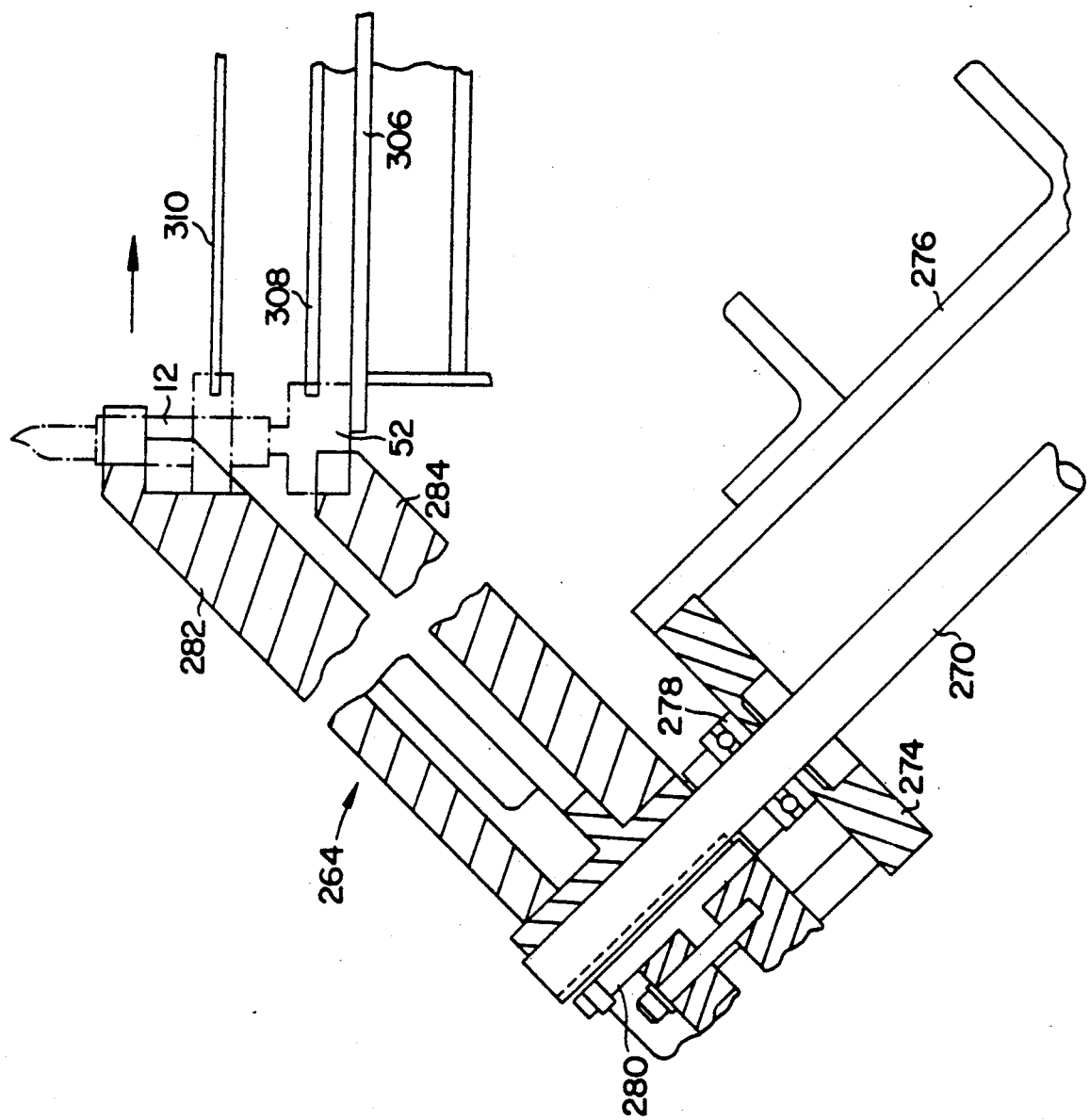
FIG. 5D is a partial sectional view in elevation showing a portion of the apparatus of the invention.

Referring to FIG. 5D, plates 178, 180 include a series of axially aligned pairs of bushings 206, 208 spaced radially between a corresponding arcuate receptacle carried at the distal end of plate 178 and central hub 182, with the pairs being arrayed circumferentially with respect to axis 62, and with each separate pair of bushings 206, 208 corresponding to each receptacle, respectively. Each pair of bushings 206, 208 has disposed therein a transfer rod 210 adapted for slideable displacement axially, i.e. parallel to axis 62 of shaft 60. At one end of each transfer rod, namely, the left end as viewed in FIGS. 5B and 5C there is attached a corresponding pair of gripper jaws 173.

Turning to FIGS. 9 and 11, each pair of gripper jaws 173 comprises a first jaw element 212 pivotally attached to block 214 by means of machine screws 216 and a second jaw 218 fixedly attached to block 214 via machine screws 220, 222. A slotted hole 224 in jaw element 212 engageable with the non-threaded shank portion of screw 220 permits jaw element to pivot relative to jaw element 218 and block 214 Jaw element 212 is integral with a cam follower extension 226 which carries at its distal end a cam roller 228. A post 230 fixed to follower 226 serves to anchor one end of a tension spring 231, the other end of which is anchored on a second post 232 fixedly extending from boss 234 on block 214. Jaw elements 212, 218 normally are biased into a closed condition by the tension in spring 231 urging rotation of element 212 relative to block 214 and element 218 about pivot points 216 and 220. However, it will be evident that when block 214 is fixed against rotation, a circumferential force exerted against cam 228 sufficient to overcome the tension in spring 231 will cause counterclockwise rotation of cam follower extension 226 about pivot 216 thereby opening jaw elements 212, 218 relative to each other.

A separate gripper jaw unit 173 is fixedly mounted on the free end of each transfer rod 210 by means of a clamping block 234 which, in turn, is securely fixed to block 214 by suitable screw fasteners (not shown). The free end of rod 210 thus is tightly clamped relative to block 214 by large screw 215 and readily supports the entire gripper jaw unit 173 substantially as shown in FIGS. 9-11.

Figure 14:
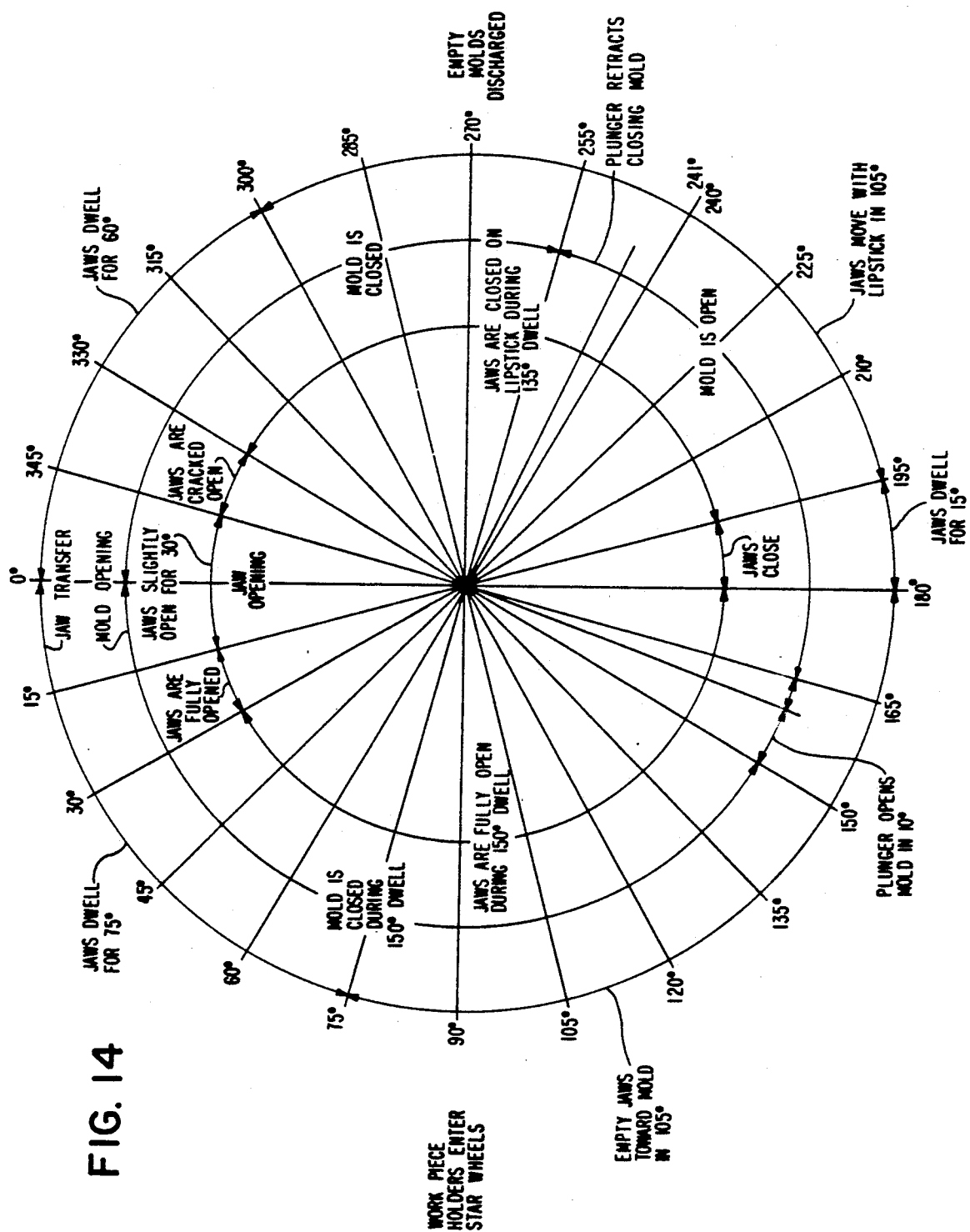
FIG. 14 is a diagram showing the phase relationship among the different cams used in the present invention.

As transfer drum 176 rotates on and with shaft 60, the various gripper jaw units 173 are activated via cam roller 228 to open or close their respective jaw elements relative to each other depending upon their instantaneous angular position in the rotation cycle. This timing program is effected by the provision of gripper jaw camming drum 240 located on shaft 60 between receiving drum 110 and transfer drum 176. Drum 240 is fixed to the framework of apparatus 50 via suitable bracket means 242 and thus, shaft 60, transfer drum 176 and receiving drum 110 all rotate relative thereto. Drum 240 defines a cylindrical camming surface 246 whose radial distance from axis 62 continuously varies according to angular displacement relative to this axis. In accordance with the present invention, the camming profile determined by camming surface 246 is shown in FIGS. 9 and 14. As indicated therein, each gripper jaw unit is cammed open as it rotates on transfer drum 176 through top dead center, is maintained open for about half a turn, closes as the jaw unit and the drum 176 rotate through bottom dead center and is maintained closed for about another half turn, or until the gripper jaw unit returns to top dead center.

While only two gripper jaw units are illustrated in FIG. 9, this is done merely for the sake of clarity. It will be appreciated that a separate jaw unit is provided for each arcuate receptacle on receiving drum 110 and the axially opposed arcuate receptacle on drum 176 associated therewith. The jaws units are so positioned relative to their corresponding axially aligned receptacles that when a particular jaw unit 173 rotates through bottom dead center and transitions from the open condition to the closed condition by the action of cam 228 on camming surface 226, the gripper jaw elements 212, 218 in that particular gripper jaw unit are adapted to firmly grasp container 12 in the mold support unit associated with that jaw unit, such gripping arrangement occurring in close axial promimity to end plate 120. This state of affairs is clearly illustrated in FIGS. 9 and 11 and corresponds to the left-most limit of axial travel of transfer rod 210.

Another important feature of the present invention is the provision of still yet further timing means comprising transfer rod camming drum 250 to control in a phased manner the axial movement of rod 210 and therefore the axial position of the gripper jaw units 173 relative to the rotation of drums 110 and 176. By causing the transfer rod (and therefore its associated gripper jaw unit) to move to the right from its position in FIG. 9, extraction of the container 12 from mold support unit 16 is carried out. Further axial movement of rod 210 to its right-most limit then is effective to insert the extracted container 12 in an inverted position into a corresponding workpiece holder 52 carried by and in a confronting opposed arcuate receptacle on the periphery of drum 176. This process of extraction and insertion for a particular container 12 via its corresponding jaw unit 173 occurs as drums 110 and 176 rotate in synchronism from about the 6:00 o'clock position to about the 12:00 o'clock position. The fully inserted condition which occurs approximately at top dead center, is shown in FIG. 10 where it will be observed the gripper jaw elements have transferred axially to their right-most limit and are in close proximity to end plate 184.

Figure 13:
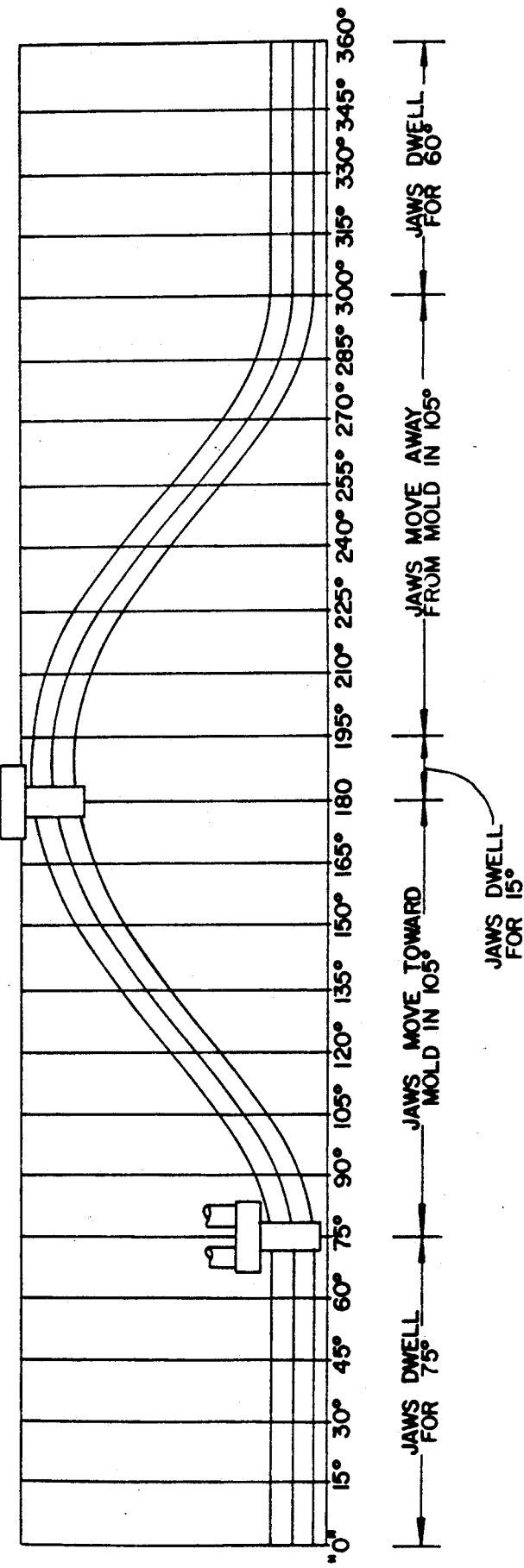
FIG. 13 is a diagram showing the cam profile of the jaw transfer cam of the present invention.

As best seen in FIG. 5C, transfer rod camming drum 250 is located immediately to the right of transfer drum 176 on shaft 60, but is fixed via bracket 252 to the framework of apparatus 50. A camming groove 254 disposed in the outer cylindrical surface 256 of drum receives therein cam roller 258 attached to the right-ost end of transfer rod 210 by means of L-shaped cam bracket 260. The axial location of camming groove 254 within surface 256 varies according to the cam profile shown in FIG. 13. As seen therein, maximum axial extent of cam follower 260 and therefore rod 210 to the left occurs at bottom dead center whereas maximum axial extent to the right of cam follower 260 and therefore rod 210 occurs at top dead center with reference to fixed transfer rod camming drum 250. Thus, as transfer drum 176 rotates, the transfer rods and gripper jaw units carried thereby will oscillate between the axially extreme positions shown in FIGS. 9 and 10.

Turning now to FIGS. 5C, 5D, 10 and 11, a second starwheel 264 is provided to pick up the filled workpiece holders at top dead center and reorient them from a horizontal to a vertical position where they may continuously be conveyed to stations 54, 56, etc. for finish processing (FIG. 1). Starwheel 264 rotates in synchronism with starwheel 84, drum 110, and drum 176 through a first bevel gear 266 fixed to shaft 60 meshing with a second bevel gear 268 mounted at the bottom end of axle 270. The latter is mounted for rotation at a 45° angle with respect to axis 62 of shaft 60 by being rotatably, supported in suitable brackets 272, 274 fixedly attached to the framework 276 of apparatus 50. Starwheel 264 is mounted at the top end of axle 270 beyond thrust bearing 278 by means of a hub 280 secured to the axle via a conventional keyway and set screw arrangement (not shown). The starwheel 264 is similar to starwheel 84 and thus comprises a pair of confronting disks, namely an upper disk 282 and a lower disk 284 fastened to hub 280 and to each other by suitable screw fasteners. As in the case of starwheel 84, the peripheral edges of disks 282, 284 terminate in beveled sections 286, 288 respectively, into which are formed a series of evenly spaced arcuate cutouts extending completely around the circumference of the starwheel to form a "saw tooth" pattern. Whereas the beveled edge of starwheel 84 has arcuate cutouts shaped and sized to accommodate a mold support unit 16 bearing a container 12 therein, the arcuate cutouts in the beveled edge of starwheel 246 are shaped and sized to receivably engage a workpiece holder 52 and the container 12 inserted therein in its inverted position. Thus, as best seen in FIGS. 10 and 11, beveled edge 286 has a first arcuate cutout 290 opening into a larger arcuate cutout 292 whereas beveled edge 288 has an arcuate cutout 294 defining a floor in bearing surface 296. As seen to best advantage in FIG. 9, the arcuate cutout 290 is adapted to engage the barrel of container 12, the enlarged arcuate cutout 292 is adapted to engage the sidewall of the workpiece holder's upper portion, the arcuate cutout 294 is adapted to engage the sidewall of the workpiece holder's bottom portion, and the floor 194 is adapted to engage the bottom surface of the workpiece holder.

Starwheel 264 is sized and positioned relative to transfer drum 176 and the rotation of starwheel 264 and drum 176 is synchronized in such manner that each set of arcuate cutouts, i.e. arcuate cutouts 290, 292, 294 and floor 296, forms an individual notch or arcuate receptacle adapted to engage the workpiece holder 52 and container 12 occupying the arcuate receptacle on drum 176 at the latter's top dead center position as shown in FIGS. 10 and 11. In this regard, it will be noted that starwheel 264 preferably has the same number of individual arcuate receptacles as there are arcuate receptacles on transfer drum 176.

Thus, referring to FIG. 11, as starwheel 264 rotates in the direction of arrow 300 in synchronism with rotation of drum 176 in the direction of arrow 202, successive workpiece holders and their containers are picked up by successive arcuate receptacles in the "saw tooth" peripheral beveled edge of starwheel 264 and conveyed along circumferentially extending rail 300 until they are discharged at the starwheel's top dead center. In order to assist such pick up, a fixed "picker" blade supported in a suitable bracket (not shown) has its tip 302 extend slightly to the right of top dead center with respect to drum 176 and is spaced underneath the bottom dead center point of starwheel 264 so that it will be adapted to engage and support container 12 extending from its workpiece holder as the workpiece holders on drum 176 successively pass through the top dead center position and are transferred to a corresponding arcuate receptacle in the rotating starwheel 264.

Hence, as starwheel 264 rotates, it serves to continuously discharge at the top dead center position (FIG.

5D) a succession of upright workpiece holders 12 each supporting a container 12 in the inverted position, i.e. with their pomade portions extending upward. The reoriented workpiece holders may then be conveyed via platform 306 and rails 308, 310 to stations 54, 56, etc. for finish processing (FIG. 1).

With reference to FIG. 14, the operation of the extractor apparatus 50 according to the present invention will now be summarized. Individual mold support units 16 with their containers 12 filled with a molded pomade 28, but supported in the mold 14 of each unit in an upside or "bottom up" mode, are fed toward the periphery of rotating starwheel 84 at the latter's top dead center position, where they are successively engaged by the arcuate receptacles or notches in the beveled peripheral edge of the starwheel, and conveyed one-by-one to the bottom dead center position of the starwheel. There, the mold support units are deposited sequentially into corresponding consecutive receptacles on drum 110 as the latter rotates through its top dead center position with the mold support units being oriented horizontally therein. Simultaneously, empty workpiece holders 52 are picked up by transfer drum 176 as the latter rotates through its 3:00 o'clock position and consecutively disposed horizontally in the peripheral receptacles on drum 176 such that each empty workpiece holder on drum 176 is axially aligned with and confronts an opposed horizontally disposed mold support unit 16 and its container 12 rotating in synchronism therewith on drum 110. At the 3:00 o'clock position, the molds in the mold support units are closed, the jaw units 173 are in their extreme right-most axial position (FIG. 10), and the jaw elements 212, 218 are fully open. As drums 110, 176 move in synchronism toward bottom dead center, the jaw units 173 which are empty begin to move axially to the left toward their corresponding mold support units carried on drum 110 by the action of the jaw transfer cam 258. At bottom dead center, plunger 140 has advanced to the right, driven by cam 158, causing mold 14 to open; the jaw units 173 are in their extreme left-most axial position (FIG. 9), and as a result of the action of jaw cam 228, the gripper jaw elements are about to close and in so doing grasp container 12 in mold support unit 16. As drums 110 and 176 continue their synchronous rotation toward and through the 9:00 o'clock position (270° in FIG. 14), the jaw transfer cam drives the jaw units with their grasped containers axially to the right toward corresponding, axially aligned opposed workpiece holders, clearing the mold support units at about 240°, shortly after which the cam 158 begins to move axially to the left thereby closing the molds in the now empty mold support units. At 9:00 o'clock, the empty mold support units are discharged via rails 310, 312 supported on bracket 314 (FIG. 8). As drums 110 and 176 continue to move synchronously toward top dead center, the jaw units 173 continue to move axially to the right reaching their extreme right-most position at about 300° at which point the containers 12 are fully inserted in their corresponding workpiece holders 52 as shown in FIG. 10. As top dead center is approached, cam 228 begins to rise on cam surface 246 and the jaw elements 212, 218 start to open becoming fully opened at a point slightly beyond top dead center (15°). By keeping the jaw elements slightly open as drums 110, 176 pass through top dead center, additional support to each container 12 and its pomade 28 is provided as the filled, horizontally disposed workpiece holders are picked up by "picker" blade 302, and engaged by the arcuate receptacles in starwheel 286. Finally, they are carried along rail 300 to be discharged in the upright position at the top dead center position of starwheel 264.

Without limiting the present invention, in an actual working model of the apparatus described above wherein starwheel 84, receiving drum 110, transfer drum 176 and starwheel 264 each had 24 stations and main shaft 60 was driven at about 6 rpm, a through-put rate of about 140 lipsticks/min. was achieved.

As used herein, the terms bottom dead center, top dead center, 90° degrees, 180°, 3:00 o'clock, 9:00 o'clock, or the like, are all taken with reference to a fixed observer located to the right of apparatus 50 and facing left with respect to FIGS. 5A-5D.

From the foregoing it will be apparent that the apparatus and method of the present invention achieves all of the objectives and advantages mentioned above. While the preferred embodiments of the present invention have been disclosed in considerable detail as required by statute, it is apparent that many modifications and/or alterations may be made thereto without departing from the principles thereof. For example, although a split-mole is preferred, it will be appreciated by those ordinarily skilled in the art that the apparatus 50 may alternatively utilize instead a so called "one-piece" mold in which event actuation of plunger 140 by cam 158 will function to clamp the mold support unit securely in place as its corresponding gripper jaw unit 173 extracts the pomade container therefrom.

Accordingly, it is desired that the present invention be limited only by the true spirit and scope of the claims annexed hereto.

I claim:

1. Apparatus for extracting a tubular article from a mold and inserting it into a workpiece holder, comprising:

first conveyer means for supporting a series of said tubular articles in their molds, second conveyer means for supporting a series of workpiece holders corresponding to said molds, said second conveyer including means for maintaining said workpiece holders in common axial alignment with said molds, means for moving said first and second conveyer means simultaneously along a predetermined path, and means for extracting the tubular articles from their molds and inserting them respectively into a corresponding workpiece holder in the direction of said common axial alignment during simultaneous movement along a portion of said predetermined path, wherein said tubular articles are supported in their respective molds with one end thereof extending from said mold, and said extracting means comprises means for inserting said one extending end into said workpiece holder, wherein said means for inserting said one extending end into said workpiece holder comprises means for moving said articles from each said mold to a corresponding workpiece holder in a linear direction transversely with respect to said predetermined path, and wherein said means for moving comprises a rotating shaft and said first and second conveyer means comprises a pair of confronting supports mounted for rotation on said shaft, and said supports in said pair being spaced axially from each other along said shaft.

2. The apparatus of claim 1 wherein said means for extracting and inserting is responsively coupled to said means for simultaneously moving said first and second conveyer means along said predetermined path.

3. The apparatus of claim 1 wherein said extracting means comprises gripper means mounted for rotation on said shaft between said pair of supports.

4. The apparatus of claim 3 wherein the rotation of said shaft defines said predetermined path, and said extracting means further comprises timing means mounted relative to said shaft and being associated with said gripper means for activating said gripper means during said portion of said predetermined path.

5. The apparatus of claim 4 wherein said extracting means further comprises second timing means associated with said gripper means for causing said gripper means to move axially between said first and second supports after said first mentioned timing means causes said gripper means to engage at least one of said articles in its corresponding mold.

6. The apparatus of claim 5 wherein said first conveyer means further includes means for engaging each of said molds, and wherein said extracting means further comprises third timing means for activating said mold engagement means prior to said gripper engaging said at least one article by the action of said second timing means, said third timing means being effective to release said mold engagement means after said gripper means begins to move axially between said first and said second supports.

7. The apparatus of claim 6 wherein said mold engagement means is effective to open said mold to release said at least one article before said first timing means causes said gripper means to engage said at least one article.

8. The apparatus of claim 1 further comprising first orienting means operatively associated with said first conveyer means for disposing said tubular articles in their molds on said conveyer means with their longitudinal axis being transversely oriented with respect to the direction of movement of said conveyer along said predetermined path and said second conveyer means includes means for disposing said workpiece holders on said second conveyer means in common axial alignment with said transversely oriented molds.

9. The apparatus of claim 8 wherein said apparatus further comprises second orienting means operatively associated with said second conveyer for reorienting said workpiece holders after extraction and insertion of said tubular articles therein such that said workpiece holders occupy the same orientation enjoyed by said molds prior to being reoriented by said first orienting means.

* * * * *